US008473899B2

(12) United States Patent
Centonze et al.

(10) Patent No.: US 8,473,899 B2
(45) Date of Patent: Jun. 25, 2013

(54) AUTOMATIC OPTIMIZATION OF STRING ALLOCATIONS IN A COMPUTER PROGRAM

(75) Inventors: Paolina Centonze, Amawalk, NY (US); Mohammed Mostafa, Kanata (CA); Marco Pistoia, Amawalk, NY (US); Takaaki Tateishi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 12/638,581

(22) Filed: Dec. 15, 2009

(65) Prior Publication Data

US 2011/0145785 A1 Jun. 16, 2011

(51) Int. Cl.
| | |
|---|---|
| G06F 9/44 | (2006.01) |
| G06F 9/45 | (2006.01) |
| G06F 17/20 | (2006.01) |
| G06F 17/15 | (2006.01) |
| G06F 15/16 | (2006.01) |

(52) U.S. Cl.
USPC ............ 717/108; 704/9; 708/422; 709/247; 717/107; 717/130; 717/137; 717/154; 717/158; 719/318; 719/328

(58) Field of Classification Search
None
See application file for complete search history.

(56) References Cited

U.S. PATENT DOCUMENTS

| | | | | |
|---|---|---|---|---|
| 6,098,080 | A * | 8/2000 | Endicott et al. | 707/999.103 |
| 6,125,400 | A * | 9/2000 | Cohen et al. | 709/247 |
| 6,807,583 | B2 * | 10/2004 | Hrischuk et al. | 719/318 |
| 7,289,948 | B1 * | 10/2007 | Mohri | 704/9 |
| 7,530,107 | B1 * | 5/2009 | Ono et al. | 717/154 |
| 7,689,638 | B2 * | 3/2010 | Theimer et al. | 708/422 |
| 7,926,071 | B2 * | 4/2011 | Stephens et al. | 719/328 |
| 2004/0064809 | A1 * | 4/2004 | Liu et al. | 717/158 |
| 2008/0222616 | A1 * | 9/2008 | Cheng et al. | 717/137 |
| 2009/0271762 | A1 * | 10/2009 | Taylor et al. | 717/107 |
| 2010/0031238 | A1 * | 2/2010 | Li et al. | 717/124 |
| 2010/0223599 | A1 * | 9/2010 | Ghosh et al. | 717/130 |

OTHER PUBLICATIONS

Ovidiu Gheorghioiu et al., Interprocedural Compatibility Analysis for Static Object Preallocation, Jan. 13-17, 2003, ACM 1-58113-628-5/03/0001, [Retrieved on Aug. 8, 2012]. Retrieved from the internet: <URL: http://dl.acm.org/citation.cfm?id=604154>. 12 Pages (273-284).*

Juggapong Natwichai et al., Efficient Semantically Equal Join on Strings, Jan. 30, 2006, [Retrieved on Jan. 26, 2013]. Retrieved from the internet: <URL: http://itee.uq.edu.au/~infs3200/_Readings/SEJ_JIS.pdf> 32 Pages 32 (1-32).*

(Continued)

*Primary Examiner* — Don Wong
*Assistant Examiner* — Anibal Rivera
(74) *Attorney, Agent, or Firm* — Louis J. Percello; Ryan, Mason & Lewis, LLP

(57) ABSTRACT

Access is obtained to an input object-oriented computer program. In the input object-oriented computer program, semantically equivalent objects are identified, which exist in different memory locations. If at least one of: a number of occurrences for the semantically equivalent objects exceeds a first threshold value, the threshold value being at least two; and a number of equality tests on the semantically equivalent objects exceeds a second threshold value, then a further step includes identifying an application program interface to reduce the semantically equivalent objects to a single object in a single memory location.

25 Claims, 9 Drawing Sheets

OTHER PUBLICATIONS

Aminul Islam et al., Semantic Text Similarity Using Corpus-Based Word Similarity and String Similarity, Jul. 2008, [Retrieved on Jan. 26, 2013]. Retrieved from the internet: <URL: http://dl.acm.org/citation.cfm?id=1376819> pp. 25 (1-24).*

Minamide et al., Static Approximation of Dynamically Generated Web Pages, WWW May 10-14, 2005, pp. 432-441.

Cytron et al., Efficiently Computing Static Single Assignment Form and the Control Dependence Graph, ACM Transactions on Programming Languages and Systems, vol. 13, No. 4, Oct. 1991, pp. 451-490.

Andersen, Program Analysis and Specialization for the C Programming Language, Ph.D. Thesis, DIKU, University of Copenhagen, May 1994.

Mohri et al., Regular Approximation of Context-Free Grammars Through Transformation, Jean-Claude Junqua and Gertjan van Noord (eds), Robustness in Language and Speech Technology. Kluwer Academic Publishers, 2000, pp. 251-261.

Nederhof et al., Practical Experiments with Regular Approximation of Context-Free Languages, 2000 Association for Computational Linguistics, vol. 26, No. 1, pp. 19-44.

A.S. Christensen et al., "Precise Analysis of String Expressions," 10th International Conference on Static Analysis Symposium (SAS), Jun. 2003, 17 pages.

E. Geay et al., "Modular String-Sensitive Permission Analysis with Demand-Driven Precision," IEEE 31st International Conference Conference on Software Engineering (ICSE), May 2009, pp. 177-187.

"String Interning," Wikipedia, http://en.wikipedia.org/wiki/String_interning, Sep. 2010, 4 pages.

"WALA," WalaWiki, http://wala.sourceforge.net/wiki/index.php/Main_Page, Sep. 2010, 2 pages.

* cited by examiner

A: ANY CHARACTER

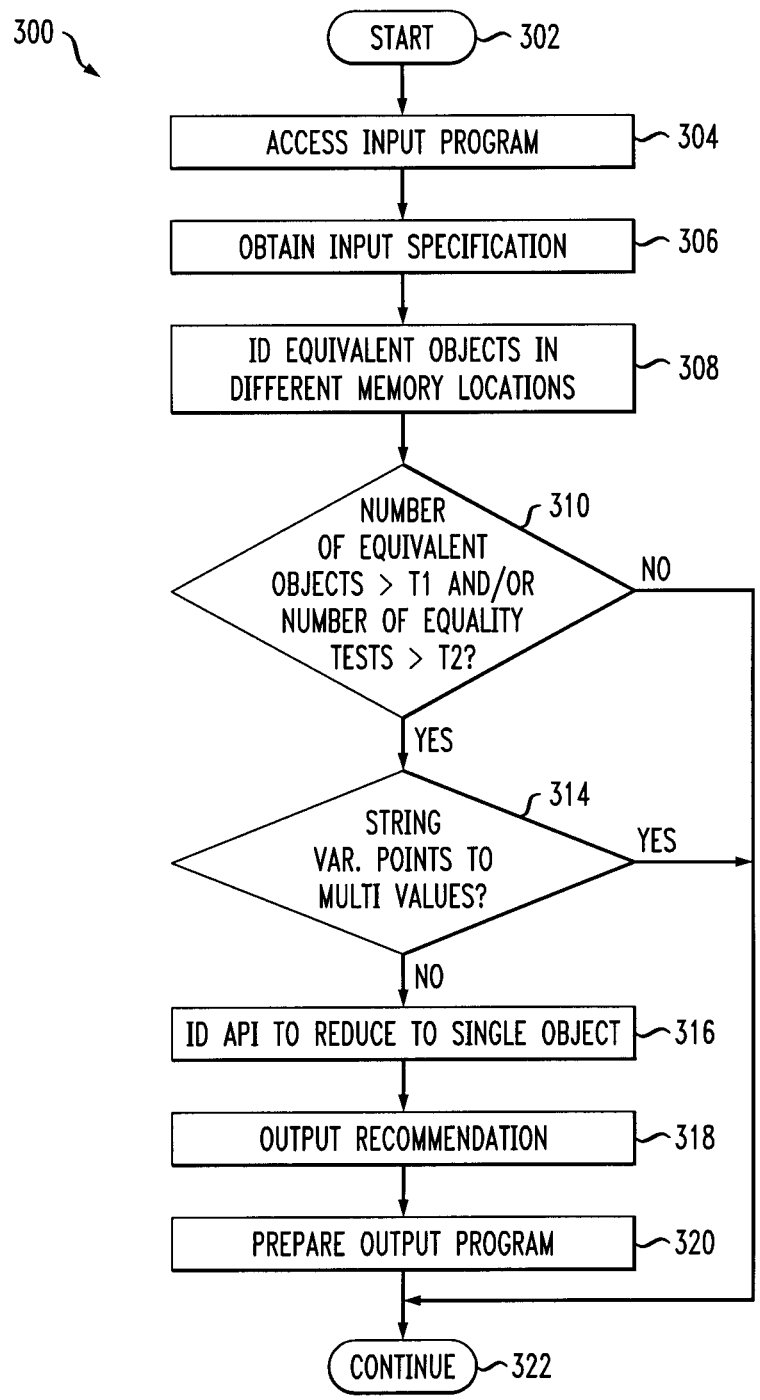

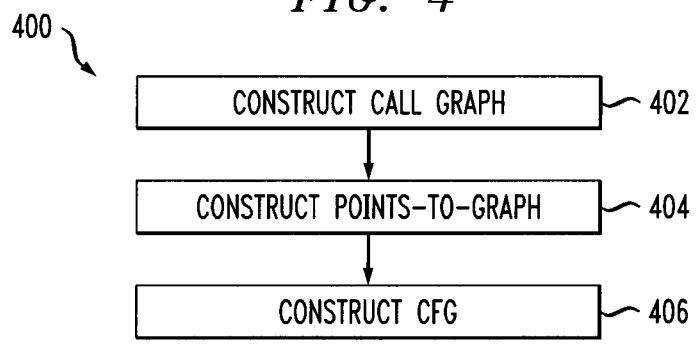
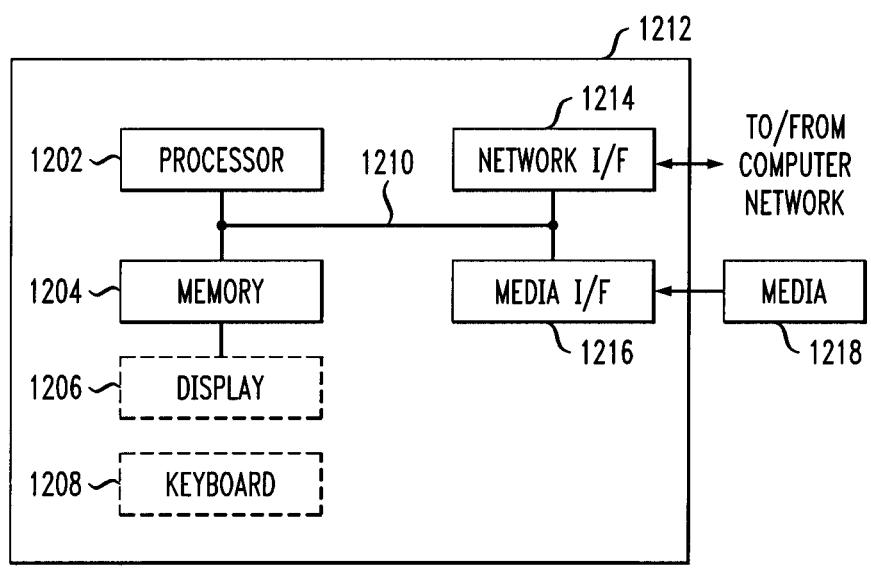

FIG. 7

```
String a = "a";
for (int i = 0; i < 3; i++)
   a = a + "a";
String r = a;
```

FIG. 8

```
public class MyClass {
  static public void main(String args[]) {
    String a = "a";
    String b = "b";
    String r = nappend(a, b, 3);
  } public void nappend(String x, String y, int n) {
    String r = null;
    if (n == 0) {
      r = x;
    }
    else {
      r = nappend(x + y, y, n-1);
    }
    return r;
  }
}
```

```
main(String)
  2. a = "a"
  3. b = "b"
  4. r = nappend(a, b, 3)

nappend(String)
  1. b1 = n == 0
  2. goto 6 if b1
  3. v1 = x + y
  4. r1 = nappend(v1, y, n-1)
  5. goto 8
  6. r2 = x
  7. goto 8
  8. r = phi(r1, r2)
  9. return r
```

$$S_a^1 \to a \qquad S_x^2 \to S_a^1$$
$$S_b^1 \to b \qquad S_y^2 \to S_b^1$$
$$S_{v1}^2 \to S_x^2 S_y^2 \qquad S_r^1 \to S_r^2$$
$$S_{r2}^2 \to S_x^2 \qquad S_x^2 \to S_{v1}^2$$
$$S_r^2 \to S_{r1}^2 \qquad S_y^2 \to S_y^2$$
$$S_r^2 \to S_{r2}^2 \qquad S_{r1}^2 \to S_r^2$$

FIG. 12

```java
import java.io.*;
import java.net.*;
public class LibraryCode {
    private static String logFileName = "log.txt";
    public static void log(String message) throws IOException {
        FileOutputStream fos = new FileOutputStream(logFileName);
        BufferedOutputStream bos = new BufferedOutputStream(fos);
        PrintStream ps = new PrintStream(bos, true);
        ps.print(message);
    }
}
```

```
class Z {
    Y y1 = new Y();
    Y y2 = new Y();
}
class Y {
    F f;
}
```

AUTOMATIC OPTIMIZATION OF STRING ALLOCATIONS IN A COMPUTER PROGRAM

FIELD OF THE INVENTION

The present invention relates to the electrical, electronic and computer arts, and, more particularly, to object-oriented programming (OOP) and the like.

BACKGROUND OF THE INVENTION

Computer programs make heavy use of strings. The input to a program and output of a program are ultimately sets of characters, and the program processes those characters internally. Strings consume a lot of memory. Every time a new string is allocated in a program, more memory is consumed. Typically, identical strings (containing the same characters) are represented as different string objects if they were allocated at different program points. Furthermore, strings are immutable. This means that if a string is modified by the program (for example, a new character is appended to it), then a new string object is allocated. As a result, strings end up consuming a large amount of the entire memory taken by a program. To resolve this issue, modern programming languages offer developers a special application program interface (API), which, when called on a string object, allows all the instance strings that are formally identical in terms of character sequences to share the same memory allocation. In other words, those strings will be identical not only from a syntactical point of view, but will actually be the same object in memory. In the well-known JAVA (mark of Sun Microsystems, Inc., Santa Clara, Calif., USA) programming language, this API is called String.intern( ). In the well-known Microsoft .NET platform, this API is called String.Intern( ).

SUMMARY OF THE INVENTION

Principles of the invention provide techniques for automatic optimization of string allocations in a computer program. In one aspect, an exemplary method includes the steps of obtaining access to an input object-oriented computer program; and identifying, in the input object-oriented computer program, semantically equivalent objects which exist in different memory locations. If at least one of: a number of occurrences for the semantically equivalent objects exceeds a first threshold value, the threshold value being at least two; and a number of equality tests on the semantically equivalent objects exceeds a second threshold value, then a further step includes identifying an application program interface to reduce the semantically equivalent objects to a single object in a single memory location.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
Reduced memory requirements
Faster execution These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 3 presents a flow chart of exemplary method steps, according to another aspect of the invention;

FIG. 4 presents a non-limiting example of one manner of carrying out step 308 of FIG. 3, according to still another aspect of the invention;

FIG. 5 depicts a computer system that may be useful in implementing one or more aspects and/or elements of the invention;

FIG. 7 is an exemplary JAVA program to which string analysis may be applied;

FIG. 8 is another exemplary JAVA program to which string analysis may be applied;

FIG. 12 shows exemplary program code;

DETAILED DESCRIPTION OF PREFERRED EMBODIMENTS

Figure 1:
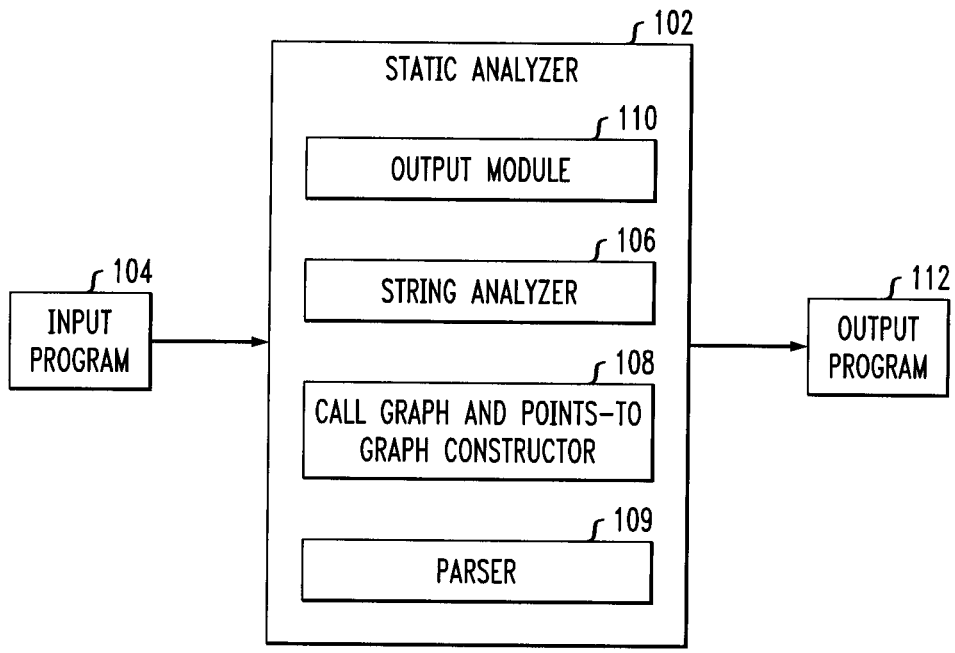
FIG. 1 presents an exemplary block diagram, according to an aspect of the invention.

As noted above, computer programs make heavy use of strings. The input to a program and output of a program are ultimately sets of characters, and the program processes those characters internally. Strings consume a lot of memory. Every time a new string is allocated in a program, more memory is consumed. Typically, identical strings (containing the same characters) are represented as different string objects if they were allocated at different program points. Furthermore, strings are immutable. This means that if a string is modified by the program (for example, a new character is appended to it), then a new string object is allocated. As a result, strings end up consuming a large amount of the entire memory taken by a program. To resolve this issue, modern programming languages offer developers a special application program interface (API), which, when called on a string object, allows all the instance strings that are formally identical in terms of character sequences to share the same memory allocation. In other words, those strings will be identical not only from a syntactical point of view, but will actually be the same object in memory. In the well-known JAVA programming language, this API is called String.intern( ). An advantage of using this API is that it reduces memory consumption. A disadvantage is that the process of "interning" a string is computationally expensive and may slow down the execution of a program if called without judgment. One or more embodiments of the invention provide techniques to automatically recognize when it is optimal to intern a string.

In particular, one or more embodiments of the invention provide a solution based on static program analysis; for example, employing static string analysis to compute the grammar of the language of all the possible values pointed to by each string variable in the program. One or more instances of the invention detect when two or more string variables point to values that may be syntactically identical. When the number of string variables pointing to the same string values exceeds a platform-specific threshold, one or more embodiments of the invention report the need for interning. It is also possible that a string variable may point to two or more values as opposed to just one. In that case, interning a string may not be the best solution. Therefore, one or more embodiments of the string-analysis-based invention emphasize those situations where interning a string is more effective because a string variable may point to just one value during the execution of a program.

One or more instances of the invention assume the use of static program analysis. The input to the tool is a program. The program is analyzed using a static string analysis module. The string analysis looks for all the string variables in the program, and for each of them computes the grammar of the language of all the possible values. It then detects situations in which two or more string variables can point to the same values, and recommends using the intern API for all the string variables corresponding to a number of identical string values exceeding a particular threshold.

Computer programs written in object-oriented languages, such as the JAVA programming language, the C++ programming language, and the C# programming language, make heavy use of objects. Each class, in the JAVA programming language, is a subclass of class java.lang.Object. As used herein, Object refers to the java.lang.Object class, and object refers to an instance of Object or (in other words) an object of type Object. The Object class implements a method called equals, which takes an object as a parameter. In one or more instances, if there are two reference variables a and b in a program, a test can be made for the equality of the two objects they point to in two different ways, each of which has a different meaning:

1. a==b: This boolean expression (double equals sign operator) returns true or false depending on whether variables a and b point to the same physical object in memory or not, respectively. In other words, this expression tests for pointer equality.
2. a.equals(b): This boolean expression returns true or false depending on whether variables a and b point to objects that are semantically equivalent.

If a==b is true, then it is expected that a.equals(b) is true as well. Another way to say this is that if a.equals(b) is false, then a==b will be false too. However, there is no guarantee that if a==b is false, then a.equals(b) is false too. Similarly, there is no guarantee that if a.equals(b) is true, then a==b is true too.

Consider the following snippet of JAVA code:
String a="Hello".toLowerCase( );
String b="Hello".toLowerCase( );

Variables a and b will point to identical String values "hello" (obtained by lowering the case of each character in the original strings, "Hello"). Since the two strings are identical character by character, a.equals(b) will return true, but a==b will return false because a and b really point to two different objects in memory, and so a pointer equality test will fail.

Instantiating two strings that are really identical is a waste of memory. As noted, computer programs make heavy use of strings. The input to a program and output of a program are ultimately sets of characters, and the program processes those characters internally. Strings consume a lot of memory. Every time a new string is allocated in a program, more memory is consumed. Typically, identical strings (containing the same characters) are represented as different string objects if they were allocated at different program points. Furthermore, strings are immutable. This makes things even worse from a memory-consumption perspective because it means that if a string is modified by the program (for example, a new character is appended to it), then a new string object is allocated. As a result, strings end up consuming a large amount of the entire memory taken by a program. In the example above, there was really no need to allocate two separate objects in memory, given that both objects contain identical sequences of literal values.

Another issue associated with allocating different objects in memory even when those objects are semantically identical is that testing for equality using the equals method can be quite expensive. For example, with two objects of type String, equals will have to scan both objects character by character to detect whether the two string literal sequences are the same or different. The == operator would be much faster because it simply tests for pointer equality.

As noted, to resolve this issue, modern programming languages offer developers a special API, which, when called on a String object, allows all the instance strings that are formally identical in terms of character sequences to share the same memory allocation. In other words, those strings will be identical not only from a semantic point of view, but will actually be the same object in memory. In the JAVA programming language, this API is called intern. Interning String objects a and b from the example above would be done as follows:
String a="Hello".toLowerCase( ).intern( );
String b="Hello".toLowerCase( ).intern( );

Now, not only is a.equals(b) true, but a==b is true as well. Therefore, to test for the equality of these two strings, now that they have both been interned, it is no longer necessary to use the equals method, but it is sufficient to use the less expensive == operator.

The intern API returns a canonical representation for the string object. A pool of strings, initially empty, is maintained privately by the runtime environment. When the intern method is invoked on a String a, if the pool already contains a string equal to a as determined by the equals method, then the string from the pool is returned. Otherwise, the given String object is added to the pool and a reference to it is returned. An advantage of using this API is that it reduces memory consumption and allows equality testing to be based on pointer equality, which is much faster than testing for semantic equality. A disadvantage is that the process of interning a string is computationally expensive. In fact, every time a string is interned, the runtime environment checks whether this string was ever interned before by checking all the strings already in the pool and testing them for equality with the current string using equals. Although this process is optimized, it is still computationally expensive, and it may slow down the execution of a program if called without judgment.

It is preferable that intern should not be used where it is not necessary. For example, if a particular sequence of characters occurs only once in a program and there is no test for equality on it in the entire program, there would be no need for interning it. In fact, it would be detrimental because interning a string has an initial cost that would not be amortized in this case. One or more embodiments of the invention provide techniques to automatically recognize when it is optimal to intern a string.

It should be noted that the above non-limiting example considered objects of type String. However, the same concept could be generalized to objects of any type. For example, if C is a class, and a and b are objects of type C, testing for the equality of a and b would probably require checking all the internal fields of a and b, and the internal fields of the internal fields, recursively, to verify that the two objects are really semantically equivalent. It would be much faster to use the == operator and just test for pointer equality. From a memory consumption point of view, it would be also desirable to avoid allocating multiple objects when they are all semantically equivalent; ideally, it would be optimal to allocate just one, which can be called the "singleton object". A singleton object can represent the equivalence class of all the objects that are semantically equivalent to it.

One or more embodiments provide a solution based on static program analysis. In particular, one or more embodiments employ static string analysis to compute the grammar of the language of all the possible values pointed to by each string variable in the program. One or more instances of the invention detect when two or more string variables point to values that may be semantically identical. When the number of string variables pointing to the same string values exceeds a platform-specific or user-provided threshold, and/or when the number of equality tests on those string variables exceeds a platform-specific or user-defined threshold, one or more embodiments of the invention report the need for interning.

With reference to FIG. 1, one or more embodiments provide a tool 102 employing static program analysis. The input to the tool is a program 104. The program is analyzed by the tool, which includes a static string analysis module 106. The string analysis looks for all the string variables in the program, and for each of them computes the grammar of the language of the possible values. It then detects situations in which two or more string variables can point to the same values, and recommends using the intern API for all the string variables corresponding to a number of identical string values exceeding a particular threshold. Call graph and points-to graph constructor 108 is discussed below with respect to the string analysis. Output module 110 can output an output program 112 which has been modified to address the issues identified; in an alternative approach, the output from module 110 could be a set of recommendations that the developer of the input program should address to optimize the memory consumption and running time of the input program.

Furthermore, one or more embodiments employ a static-analysis solution that can be generalized to detect not only String objects that are semantically equivalent, but also more general objects that are semantically equivalent, which allows for recommending memory-consumption and performance optimization.

One or more embodiments of the invention may be realized as a computer program implemented on one or more hardware processors, which program analyzes other programs (object oriented programs). In an optional approach, in addition to program 104, tool 102 also receives as input a specification to be discussed below. Tool 102 preferably recognizes whether different objects instantiated by program 104 are syntactically equivalent (i.e., the same). For example, suppose there is a class in program 104 called Employee. Suppose there are two objects of type Employee; for example Employee object John Smith with Social Security Number 123-45-6789 and another employee object John Smith also with Social Security Number 123-45-6789. Here, there is no need to have two objects (which might be the case with two John Smiths having different Social Security Numbers); this is a waste of memory and also a waste of time. The equals method will return a true value; however, == will return false because they are two different objects even though they represent the same person. The equals method is more expensive. Accordingly, one or more embodiments recognize equality in advance, and in effect instrument program 104 so that == can be used instead of equals, so that the modified program 112 will use less memory and/or run faster.

One or more embodiments of the invention are particularly applicable to String objects. Consider two syntactically identical strings in program 104, say a and b, which nevertheless represent the same sequence of characters. The equals method will return true but the == operator will return false. Note that the above-mentioned intern API can address this problem, but itself has an associated cost. Therefore, if a string appears only once or never is called in an equals expression, it may not be appropriate to use the intern API. One or more embodiments of the invention determine where use on intern is appropriate.

As noted, in some instances, tool 102 receives as input not only program 104, but also a specification. The specification may set forth, for example, that it is "worth it" to call intern on a particular string only if such string appears at least four times in a program. This is, of course, a non-limiting example, it being understood that in general terms, the specification may include a configurable threshold setting forth how many times a string may appear in the program 104 before it is recommended to call intern. In other cases, a fixed value may be hard-coded in the tool, rather than set forth in a specification. It will be understood that the value is typically always at least two.

In one or more embodiments, for every string variable (e.g., a and b), the tool produces a grammar of all the possible strings pointed to by that particular variable. In some cases, the grammar must be computed; for example, "Hello"+"txt"+ "Goodbye", the concatenation of three constants, is not itself a string constant, and so the resulting grammar is not trivial as in the case of a string constant, and must be explicitly computed. Other operations can be carried out on strings; for example, extracting substrings, transforming to lower or upper case, and so on. One or more embodiments compute all the possible string values pointed to by a particular string variable. In some instances, if it is detected that two variables point to the same value, then the use of intern can be recommended.

Strings are but one example of types that can be addressed using one or more embodiments of the invention. For example, as noted above, the type Employee could be addressed by detecting when two instances of Employee are identical because all their fields are identical, recursively. Employee is the case of a user-defined class, but standard classes, such as subclasses of Set and Map, could also be addressed, and the tool of one or more embodiments of the invention detects cases where a singleton should be instantiated instead of multiple instance all identical to each other. In a broad sense, equality between two objects is detected and an API similar to intern is recommended. On the Microsoft .NET platform, the API corresponding to JAVA's intern is String.Intern. For other classes, it is common for the corresponding API to be called getInstance. This is usually a static method, which checks if an instance with the given characteristics already exists in a local cache. If the answer is yes, then the existing instance is returned from the local cache without having to duplicate it. If the answer is no, then getInstance invokes the constructor (which is usually private, so no other code can access it), creates a new instance of the class with the given characteristics, updates the local cache, and returns the instance.

To summarize, in one or more embodiments, tool 102 takes as input program 104 (in general, a source listing and/or a compiled program, preferably linked to the underlying libraries, can be employed). This is possible because existing static analysis tools, such as IBM's Watson Library for Analysis (WALA) (well-known in itself to the skilled artisan and discussed elsewhere herein) are capable of analyzing both source code and bytecode. Within program 104, use tool 102 to identify different objects (different memory allocations in the static analysis abstractions), which are really identical except for existing in different memory locations. Determine whether the number of occurrences of the given object exceeds a threshold (at least two), and if this is true, employ a suitable API to reduce the "different" objects to the same object such that the pointer to memory is identical. In a specific example, the objects are strings and the API is intern. The output may include an instruction to apply the API to the particular object; as shown in FIG. 1, in some instances, the instructions can be implemented to develop an output program 112 with the API(s) applied as appropriate to enhance efficiency.

Figure 13:
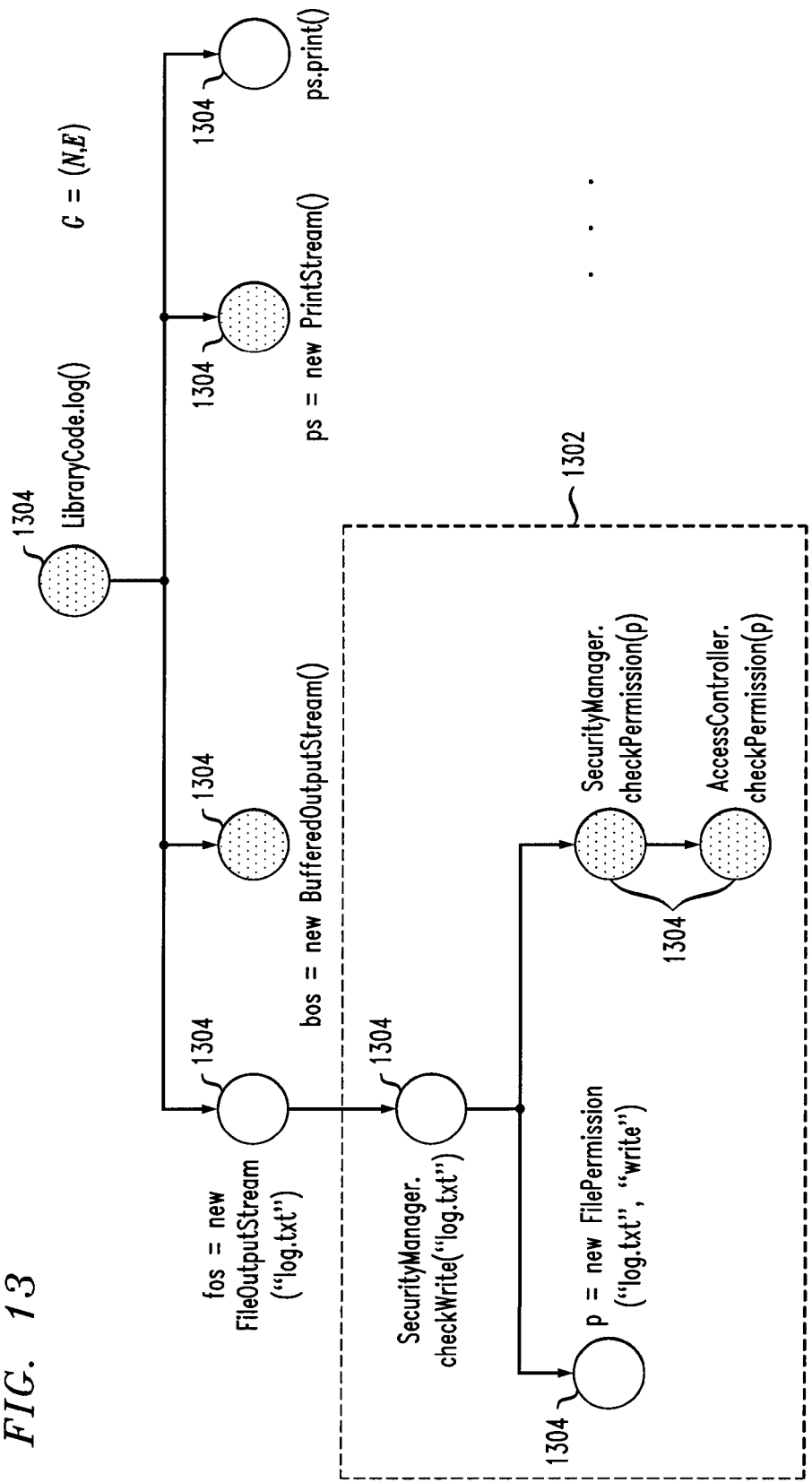
FIG. 13 shows a call graph corresponding to the code of FIG. 12.

Module 108 may parse the input program 104 and build a mathematical model of same in the form of a graph wherein the nodes of the graphs represent the methods in the program under analysis and the edges represent method invocations. This permits tracking the flow of strings throughout the graph. For example, a method may simply be a chunk of code and it may not be feasible to resolve a string value by just analyzing it; rather, it may be necessary to look to other methods which may have passed a value into the method of interest; thus, the desirability of a comprehensive model for the entire program. On top of the mathematical model (graph), run the string analysis, and output the recommended changes (or output program 112) using output module 110. FIG. 13 shows a subset of a sample call graph corresponding to the exemplary code of FIG. 12. The nodes and edges within the dotted border 1302 represent library calls that are not visible from the code shown because they belong to standard libraries. Nodes are all numbered as 1304.

String Analysis

The objects just described are preferably located using string analysis. String analysis can be used not only to resolve String objects, but also primitive values (such as numerical values, characters, and boolean values), and ultimately, objects of any type. In fact, suppose that an object contains a field that it is neither of type String nor a primitive value. That field will contain other fields, and those fields will contain other fields, and so on. Ultimately, every field will eventually point to a String object, a primitive value, or null. Therefore, by iterating string analysis, it is eventually possible to discover object equality. It is very common for a String variable in a program to assume values that are dynamically generated and known only at run time. For example, a String variable fileName can point to something like dir+File.separator+name.substring(1). Detecting the value of this string statically is important if the goal is to optimize the use of intern. All string constants are automatically interned in the JAVA programming language. Therefore, it is important to be able to compute the value of a non-constant string variable, such as the fileName variable above.

String analysis, in one or more embodiments, includes a family of static program analyses that approximate the possible string values of the program variables of type String arising at run time. Given the teachings herein, the skilled artisan will be able to implement suitable string analysis techniques; for example, by adapting known techniques such as those of Yasuhiko Minamide, "Static approximation of dynamically generated web pages," (expressly incorporated herein by reference in its entirety for all purposes) in WWW '05: Proceedings of the 14th international conference on World Wide Web, pages 432-441, New York, N.Y., USA, 2005 ACM Press, and references therein.

In one or more embodiments, a Context-Free Grammar (CFG) represents the possible string values assigned to program variables. The CFG is deduced by solving the subset constraints among the sets of strings assigned to program variables. For every predefined string operation that appears in a program, automatically generate a sound approximation of the transformation that maps the CFG representing the possible input strings to the CFG of the possible output strings. Sound here means that the resulting CFG contains all the actual strings arising at run time. For example, method toLowerCase, used in the examples above, can be approximated by a homomorphism, which is a structure-preserving mapping between CFGs.

Similarly, consider method substring(2) in the following JAVA code snippet:

```
String a = "xyz";
for (int i = 0; i < 3; i++) {
    a = a + "a";
}
String r = a.substring(2);
```

Figure 2:
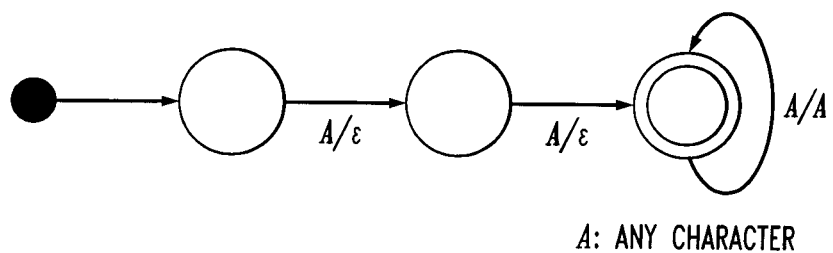
FIG. 2 shows an exemplary transducer.

This can be represented by a finite automaton with output, or transducer, which induces a stateful transformation, as shown in FIG. 2. In FIG. 2, the transitions labeled with A/ε indicate that the transducer will produce a (no character) for the first two input characters read. The CFG approximating the output of the JAVA program obtained by considering assignments as production rules is then transformed into another CFG via the transducer (the image of a CFG under a transducer is a CFG).

To be executed, the string analysis relies on an inter-procedural static analysis, which includes a call graph and a points-to graph. Call graph and points-to graph constructor 108 can be employed to implement the techniques described herein. The call graph G=(N, E) represents the execution of the program by showing how different procedures (or methods) relate to each other. Particularly, each node n in N represents a method, and each edge e in E represents a method call. If e=($n_1$, $n_2$) is in E, that means that the method represented by $n_1$ contains an invocation to the method represented by $n_2$. This graph is used to detect where string values can flow during the execution of a program. A points-to graph is used to represent which objects are pointed to by which variables. The string analysis relies on these two abstractions to model the flow of String objects and their interactions during the execution of a program.

Any input program either in source or binary form—preferably along with all its supporting libraries—can be given as an input to the static analyzer. The output can then, in at least some instances, be a set of recommendations that the developer of the input program should address to optimize the memory consumption and running time of the input program. In an alternative, the output could just involve an automatic transformation of the input program to address the issues identified.

One underlying string analysis technique that can be employed is described in detail below. The skilled artisan will be familiar with same from U.S. Pat. No. 7,530,107 of Ono et al., entitled "Systems, methods and computer program products for string analysis with security labels for vulnerability detection." Nevertheless, the complete disclosure of the aforesaid U.S. Pat. No. 7,530,107 is expressly incorporated herein by reference in its entirety for all purposes.

Also expressly incorporated herein by reference in its entirety for all purposes is the article by Emmanuel Geay, Marco Pistoia, Takaaki Tateishi, Barbara G. Ryder, and Julian Dolby, entitled "Modular string-sensitive permission analysis with demand-driven precision," published by the IEEE Computer Society, Washington, D.C., USA, in the ICSE, pp. 177-187, 2009 IEEE 31st International Conference on Software Engineering, 2009.

String analyses are static program analysis techniques to infer string values arising at runtime without executing a program. One non-limiting example is a JAVA String Analyzer (JSA), which outputs regular expressions. Another non-limiting example approximates possible string values by a Context-Free Grammar (CFG). Thus, the resulting sets of string values can be more precise than the ones of JSA.

Figure 6:
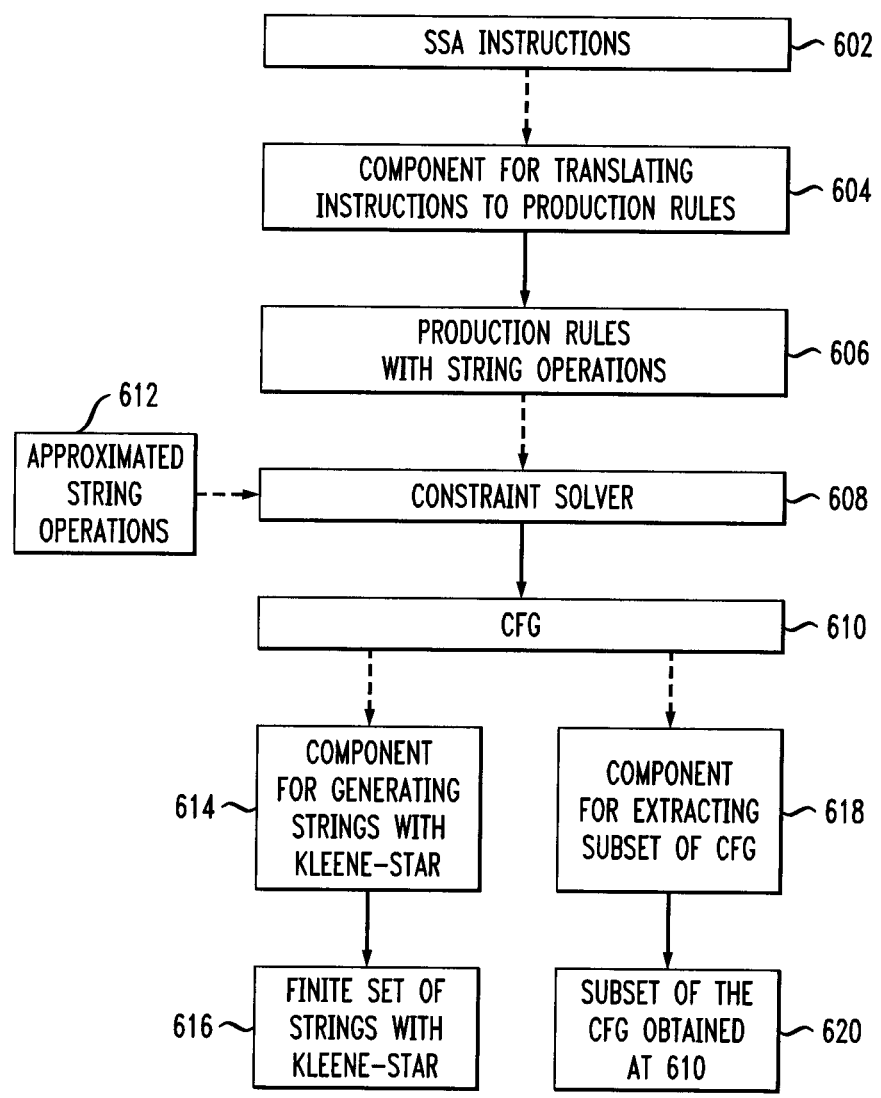
FIG. 6 presents an overview of string analysis, useful in practicing one or more embodiments of the invention.

As seen in FIG. 6, which presents an overview of one non-limiting exemplary approach to string analysis, Static Single Assignment (SSA) instructions 602 are provided to a component 604 for translating instructions to production rules. The output 606 includes production rules with string operations. Thus it is already related to a CFG, but may not only contain constant assignments and concatenations as in a CFG, but arbitrary string operations. Such output 606 as well as approximated string operations 612 are input into constraint solver 608, which outputs CFG 610. A constraint solver is only one non-limiting example of a tool for performing the CFG transformations and optimizations needed to transform output 606 into a CFG. Optionally, CFG 610 may be provided to a component 614 which further over-approximates the CFG by a regular language for easier readability by humans, and in one non-limiting example by representing the regular language by a finite set of strings 616 with kleene-star, where the kleene-star is represented by "*". The "kleene-star" operator is defined as follows: an expression x* for a string x denotes any number of iterations of the string x, thus the empty string, x, xx, xxx, and so on. Optionally, CFG 610 is also provided to a component 618 for extracting a subset of the CFG, with the resultant subset output at 620.

In one or more embodiments, approximate the possible string values of a string expression by a CFG. As noted below, soundness means that a resulting CFG computed by the string analysis contains all the actual strings arising at runtime. By "approximation" is meant the same thing: there might be too many strings in the CFG but not too few—no matter what representation of strings are obtained (list, regular expression, CFG) this is what is desired.

The constraint solver 608 transforms the production rules with string operations to a CFG while removing those string operations by applying approximated string operations 612, which are modeled by simple replacements of production rules with string operations, transducers, and other mathematical functions. For example, the string concatenation s=s1+s2 is translated to the production rule s→+(s1,s2) with the string operation + by the component 604, then transformed to the production rule s→s1 s2 by the constraint solver 608 by the simple replacement (because concatenation is a basic operation of a CFG and does not need an approximation).

Given the JAVA program of FIG. 7, which appends "a" to the string assigned to the variable a three times after initializing it with "a.", the following CFG is obtained through the component 604 and the constraint solver 608:

$S_a \rightarrow a$
$S_a \rightarrow S_a a$
$S_r \rightarrow S_a$

While in reality this transformation passes through the SSA stage, it will be appreciated that in this simple example, these productions result from lines 1, 3, and 4 of the program, respectively. While the specific exemplary string analysis sample does not evaluate line 2 and thus does not limit how many letters "a" are added to the string, a more complex static analysis that would roll out this loop with 3 iterations and thus found that precisely 3 letters "a" are added, when available, could equally be used where appropriate.

When a program is encountered that uses predefined string operations such as String.substring as shown in the following program, a sound approximation can be employed for every string operation to translate a CFG to a CFG. These sound approximations may be prepared as a library 612. If new string operations are encountered, the library may be extended.

String a="xxa";
for (int i=0; i<3; i++) a=a+"a";
String r=a.substring(2);

Intuitively, soundness means that a resulting CFG computed by the string analysis contains all the actual strings arising at runtime. (The soundness is formally defined as follows: f is a sound approximation for a string operation f iff for all sets S of strings, $S' \subset f(S)$ where $S'=\{s'|s'=f(s), s\in S\}$). Soundness of an approximation of an operation means that for all input sets, the output set of the approximation is a superset of the output set of the original operation. One of the methods to approximate predefined string operations is to use a transducer which is an automaton with output. It is well known to the skilled artisan (see Yasuhiko Minamide, supra, and references therein) that the image of a CFG under a transducer is also a CFG. The complete Minamide reference is expressly incorporated by reference herein in its entirety for all purposes. FIG. 2 shows a transducer substring (_, 2). The transitions labeled with A/c indicate that the transducer will produce the empty string for the first two input characters, and the transitions labeled with A/A indicate that the transducer will produce a string consisting of the remaining input characters, where A stands for an arbitrary character. Other methods to approximate predefined string operations include homomorphisms on $(\Sigma, +)$ where $\Sigma$ is a set of characters and + denotes concatenation; functions that always return the same CFG yielding all the possible strings returned by corresponding predefined string operations; and so on. The following production rules with the approximated string operation substring (_, 2) are the ones obtained from the program just above:

$S_a \rightarrow xxa$
$S_a \rightarrow S_a a$
$S_r \rightarrow substring(S_a, 2)$ The approximated string operation substring (_, 2) is defined by the transducer shown in FIG. 2 and is a sound approximation for the string operation _.substring(2). By applying that transducer to the grammar and using the constraint solver 408, the following CFG is obtained, which represents the set {"a," "aa," "aaa," "aaaa," ... }:

$S_a' \to a$
$S_a' \to S_a'a$
$S_T \to S_a'$

The constraint solver may also be used to optimize a CFG. E.g., consider the program
a="a";
for (int i=0; i<3; i++) a=a+"a";
r=a;
r=r+"a";

The initial CFG derived directly from the production rules 406 is $S_a \to a$
$S_a \to S_a+a$
$S_r \to S_a$
$S_r \to S_r+a$ If there is interest only in the possible values of r, then $S_r$ is the start symbol of this grammar, and the constraint solver 408 may optimize this grammar to $S_r \to a$
$S_r \to S_r+a$ A non-limiting example will now be provided regarding implementation of the string analysis. The description first deals with intra-procedural string analysis, and then explains how to extend that to inter-procedural string analysis. The implementation details presented herein assume for illustrative purposes that the string analysis has been implemented on top of the static analysis framework known as "T. J. Watson Libraries for Analysis (WALA)," available as an open source product from SourceForge, Inc., 650 Castro Street, Suite 450, Mountain View, Calif. 94041 USA. The skilled artisan will be familiar with WALA.

Figures 9, 10, 11:
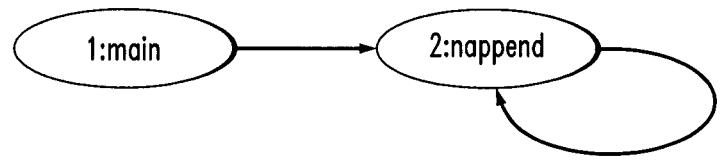
FIG. 9 depicts the JAVA program of FIG. 8 in a pseudo-Static Single Assignment (SSA) form.
FIG. 10 presents a call graph for the program of FIG. 8.
FIG. 11 presents production rules translated from FIG. 9.

To illustrate the intra-procedural string analysis, consider the "nappend" method shown in FIG. 8, which intuitively applies the string 'y' to the string 'x' for 'n' times. The first step of analysis is to translate the program into Static Single Assignment (SSA) form as shown in FIG. 9, where pseudo notations have been employed for instructions:

v=val for an assignment of a value val to a variable or a field v;
v=obj.func(v1, ..., vn) for a method invocation of the function func of object obj with arguments v1, ..., vn;
goto N for an unconditional jump to the label N; and
goto N if v for a conditional jump to the label N by the condition v.

The skilled artisan will be familiar with SSA from, for example, Ron Cytron, Jeanne Ferrante, Barry K. Rosen, Mark N. Wegman, and F. Kenneth Zadeck, Efficiently computing static single assignment form and the control dependence graph, *ACM Trans. Program. Lang. Syst.*, 13(4):451-490, 1991, expressly incorporated by reference herein in its entirety for all purposes.

In addition, the SSA transformation introduces new variables and a φ-function, which is denoted by phi(v1,v2), to yield a program which has only one assignment to each variable. The φ-function joins the values of several variables. This characteristic of the SSA form is suitable to find data dependencies. Then translate the assignments in SSA form to a set of production rules with string operations, except for conditional and unconditional jumps, in the same manner described above. In particular, v=phi(v1,v2) is translated into two production rules $S_v \to S_{v1}$ and $S_v \to S_{v2}$ so as to make it represent a union of the two sets of strings assigned to v1 and v2, respectively. According to this translation, the following production rules can be obtained from the pseudo SSA form of the nappend method:

$S_{v1} \to S_x S_y$
$S_{r1} \to \text{nappend}(S_{v1}, S_y, n-1)$
$S_{r2} \to S_x$
$S_r \to S_{r1}$
$S_r \to S_{r2}$ For the inter-procedural string analysis, the intra-procedural string analysis is naturally extended with the call graph information constructed by WALA, whose context-sensitivity can be flexibly controlled. In one or more embodiments, annotate every variable in the SSA program with a call graph node. After that, combine all the production rules, after removing production rules translated from method invocations such as $Sr1 \to \text{nappend}(S_{v1}, S_y, n-1)$. Instead, introduce production rules representing dependencies between the parameters and the return value of a callee method and the variables of a caller method. For example, the following production rules are introduced in the case of a context-insensitive call graph as shown in FIG. 10, where the superscript of each nonterminal represents the corresponding call graph node. Note that FIG. 10 is a call graph for the program in FIG. 8.

$S_x^2 \to S_a^1 \quad S_x^2 \to S_{v1}^2$
$S_y^2 \to S_b^1 \quad S_y^2 \to S_y^2$
$S_r^1 \to S_r^2 \quad S_{r1}^2 \to S_r^2$ FIG. 11 shows the complete set of the production rules obtained from the program. Then obtain the following CFG (for example, as output of the constraint solver 608) that predicts possible strings assigned to the variable r in the main method, where the start symbol is $S_r^1$.

$S_r^1 \to a|S_r^1 b$

In addition, leverage a pointer analysis in the translation from the program to the production rules with string operations in order to make the string analysis more precise. In particular, the pointer analysis helps the string analyzer to identify how constant strings flow to variables across methods and to identify whether the same objects are assigned to different variables in potentially different methods, even if those objects are dynamically created.

It is well-known to the skilled artisan (see, for example, An Introduction to the Theory of Computation, Eitan Gurari, Ohio State University, Computer Science Press, 1989, ISBN 0-7167-8182-4) that a CFG can be over-approximated by a regular grammar and it can be translated to a regular expression through the transformation from the regular grammar to a finite-state automaton (Step 614). The complete Gurari reference is expressly incorporated herein by reference in its entirety for all purposes. In one or more embodiments, this step may be extended by transforming the resulting regular expression into a finite set of strings with "kleene-star," which is also a set of regular expressions without the choice operator. For example, with the above transformations, the following CFG can be transformed to the set of strings {"ac*", "bc*",}:

$S_r^1 \to a|b|S_r^1 c$

Recapitulation

Given the discussion thus far, and with attention to flow chart 300 of FIG. 3, which begins in block 302, it will be appreciated that, in general terms, an exemplary method, according to an aspect of the invention, includes the step 304 of obtaining access to an input object-oriented computer program 104. The method further includes step 308 of identifying, in the input object-oriented computer program, semantically equivalent objects which exist in different memory locations. As per decision block 310, if (i) the number of occurrences for the semantically equivalent objects exceeds a first threshold value (at least two) or (ii) the number of equality tests on the semantically equivalent objects exceeds a second threshold value, then, as per block 316, identify an application program interface to reduce the semantically equivalent objects to a single object in a single memory location.

Processing continues in block 322.

It should be understood that in the most general case, step 310 can include testing only whether the number of occurrences for the semantically equivalent objects exceed the first threshold value; testing only whether the number of equality tests on the semantically equivalent string values exceed the second threshold value; testing for both of these conditions and returning a "YES" only if both are satisfied; and testing for both of these conditions and returning a "YES" if either is satisfied In step 304, the input object-oriented computer program 104 may be obtained as a source version or as a compiled version; in the latter case, preferably linked to underlying libraries.

Optional step 306 includes obtaining an input specification; for example, the values of the first and/or second thresholds.

In a specific but non-limiting exemplary application, the input object-oriented computer program 104 is written in the JAVA programming language, the semantically equivalent objects are semantically equivalent string values, and the application program interface is intern.

In optional step 314, refrain from identifying the application program interface in a case where a given one of the string values points to multiple values, as discussed above. Note that the API is also not used when step 310 returns a "NO."

In optional step 318, output a recommendation to apply the application program interface to reduce the semantically equivalent objects to a single object in a single memory location.

In optional step 320, apply the application program interface to reduce the semantically equivalent objects to a single consolidated object in a single memory location, to obtain an output object-oriented computer program 112.

With reference now to flow chart 400 of FIG. 4, in some instances, the semantically equivalent objects are semantically equivalent string values, and step 308 includes: sub-step 402, constructing a call graph having nodes representing methods of the input object-oriented computer program and edges representing calls of the methods; sub-step 404, constructing a points-to graph representing which objects (of all the objects) are pointed to by which variables (of all the variables); and sub-step 406, namely, based on the call graph and the points-to graph, constructing a context-free grammar to represent the language of all the possible string values assigned to all the string variables of the input object-oriented computer program (since at this stage it is not yet known which are semantically equivalent).

Steps 304 and 306 can be carried out, for example, at least in part by a parser 109 and by the call graph and points-to graph constructor 108. Steps 308-314 can be carried out, for example, at least in part by the string analyzer 106. Steps 316-320 can be carried out, for example, at least in part the output module 110. Sub-steps 402-406 can be carried out, for example, at least in part by the call graph and points-to graph constructor 108.

Additional Comments on Call Graphs and Points-to Graphs

Figures 14, 15:
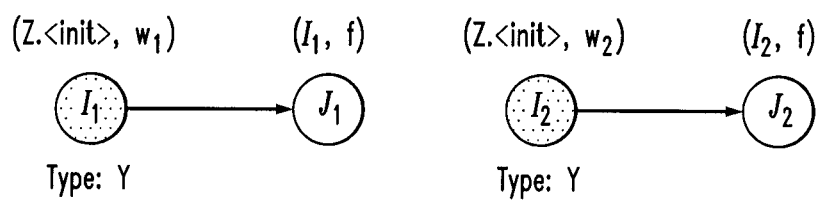
FIG. 14 shows further exemplary program code.
FIG. 15 shows a points-to graph corresponding to the code of FIG. 14.

There are many ways to represent call graphs and points-to graphs. In a preferred embodiment, a points-to graph is a bipartite graph in which nodes are of two kinds: primary keys and instance keys. A primary key represents a pointer, and an instance key pointed to by a pointer key represents an equivalence class of objects that the pointer key's pointer can point to. There are many ways in which objects are partitioned into equivalence classes. An accurate solution explained in the literature (L. O. Andersen. Program Analysis and Specialization for the C Programming Language, PhD thesis, University of Copenhagen, Denmark, 1994, with which the skilled artisan will be per se familiar) bases this partitioning on the objects' allocation sites. The complete Andersen reference is expressly incorporated herein by reference in its entirety for all purposes. For example, based on the JAVA code snippet in FIG. 14, note two allocations of objects of type Y. Both allocations take place inside the constructor of class Z, indicated with Z.<init>. Assuming that the bytecode offset of the first allocation is $w_1$ and that of the second allocation is $w_2$, then there are two instance keys of type Y: $I_1$=(Z.<init>, $w_1$) and $I_2$=(Z.<init>, $w_2$). Each instance key is of type Y, and since Y has a field f of type F, then each of the instance keys above points to a pointer key: $I_1$ points to pointer key $J_1$=($I_1$, f) and $I_2$ points to $J_2$=($I_2$, f). FIG. 15 offers a graphical representation of the points-to graph for the code snippet in FIG. 14.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 5, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Note that the tool 102 may, in the most general case, execute on a different computer than the programs 104, 112, or on the same computer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a parser module, a call graph and points-to graph constructor module, a string analyzer module, and an output module. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
  obtaining access to an input object-oriented computer program;
  identifying, in said input object-oriented computer program, semantically equivalent objects which exist in different memory locations; and
  if at least one of:
    a number of occurrences for said semantically equivalent objects exceeds a first threshold value, said threshold value being at least two; and
    a number of equality tests on said semantically equivalent objects exceeds a second threshold value;
  identifying an application program interface to reduce said semantically equivalent objects to a single object in a single memory location.

2. The method of claim 1, wherein said identifying of said application program interface is responsive at least to said number of occurrences for said semantically equivalent objects exceeding said first threshold value.

3. The method of claim 2, wherein said access is obtained to a source version of said input object-oriented computer program.

4. The method of claim 2, wherein said access is obtained to a compiled version of said input object-oriented computer program.

5. The method of claim 4, wherein said compiled version of said input object-oriented computer program is linked to underlying libraries.

6. The method of claim 1, wherein said first threshold value is obtained as an input specification.

7. The method of claim 1, wherein:
  said input object-oriented computer program is written in JAVA programming language;
  said semantically equivalent objects comprise semantically equivalent string values; and
  said application program interface comprises intern.

8. The method of claim 7, further comprising refraining from identifying said application program interface in a case where a given one of said string values points to multiple values.

9. The method of claim 7, wherein said identifying of said application program interface is responsive at least to said number of equality tests on said semantically equivalent string values exceeding said second threshold value.

10. The method of claim 9, wherein said identifying of said application program interface is further responsive to said number of occurrences for said semantically equivalent string values exceeding said first threshold value.

11. The method of claim 1, further comprising outputting a recommendation to apply said application program interface to reduce said semantically equivalent objects to a single object in a single memory location.

12. The method of claim 1, further comprising applying said application program interface to reduce said semantically equivalent objects to a single consolidated object in a single memory location, to obtain an output object-oriented computer program.

13. The method of claim 1, wherein:
  said semantically equivalent objects comprise a subset of a general set comprising all objects of said program;
  said program has variables;
  said semantically equivalent objects comprise semantically equivalent string values;
  said identifying of said semantically equivalent objects comprises:

constructing a call graph having nodes representing methods of said input object-oriented computer program and edges representing calls of said methods;

constructing a points-to graph representing which objects of said general set of objects are pointed to by which of said variables;

based on said call graph and said points-to graph, constructing a context-free grammar to represent possible string values assigned to string variables of said input object-oriented computer program.

14. The method of claim 1, further comprising providing a system, wherein the system comprises distinct software modules, each of the distinct software modules being embodied on a computer-readable storage medium, and wherein the distinct software modules comprise a parser module, a string analyzer module, and an output module;

wherein:

said obtaining is carried out by said parser module executing on at least one hardware processor;

said identifying of said semantically equivalent objects is carried out by said string analyzer module executing on said at least one hardware processor; and said identifying of said application program interface is carried out by said output module executing on said at least one hardware processor.

15. A computer program product comprising a computer readable storage medium having computer readable program code embodied therewith, said computer readable program code comprising:

computer readable program code configured to obtain access to an input object-oriented computer program;

computer readable program code configured to identify, in said input object-oriented computer program, semantically equivalent objects which exist in different memory locations; and computer readable program code configured to, if at least one of:

a number of occurrences for said semantically equivalent objects exceeds a first threshold value, said threshold value being at least two; and a number of equality tests on said semantically equivalent objects exceeds a second threshold value;

identify an application program interface to reduce said semantically equivalent objects to a single object in a single memory location.

16. The computer program product of claim 15, wherein said identifying of said application program interface is responsive at least to said number of occurrences for said semantically equivalent objects exceeding said first threshold value.

17. The computer program product of claim 16, wherein said access is obtained to a source version of said input object-oriented computer program.

18. The computer program product of claim 16, wherein said access is obtained to a compiled version of said input object-oriented computer program.

19. The computer program product of claim 18, wherein said compiled version of said input object-oriented computer program is linked to underlying libraries.

20. An apparatus comprising:
a memory; and
at least one processor, coupled to said memory, and operative to:

obtain access to an input object-oriented computer program;

identify, in said input object-oriented computer program, semantically equivalent objects which exist in different memory locations; and if at least one of:

a number of occurrences for said semantically equivalent objects exceeds a first threshold value, said threshold value being at least two; and a number of equality tests on said semantically equivalent objects exceeds a second threshold value;

identify an application program interface to reduce said semantically equivalent objects to a single object in a single memory location.

21. The apparatus of claim 20, wherein said identifying of said application program interface is responsive at least to said number of occurrences for said semantically equivalent objects exceeding said first threshold value.

22. The apparatus of claim 21, wherein said access is obtained to a source version of said input object-oriented computer program.

23. The apparatus of claim 21, wherein said access is obtained to a compiled version of said input object-oriented computer program.

24. The apparatus of claim 20, further comprising a plurality of distinct software modules, each of the distinct software modules being embodied on a computer-readable storage medium, and wherein the distinct software modules comprise a parser module, a string analyzer module, and an output module;

wherein:

said at least one processor is operative to obtain access to an input object-oriented computer program by executing said parser module;

said at least one processor is operative to identify said semantically equivalent objects by executing said string analyzer module;

said at least one processor is operative to identify said application program interface by executing said output module.

25. An apparatus executed by at least one processor, the apparatus comprising:

means for obtaining access to an input object-oriented computer program;

means for identifying, in said input object-oriented computer program, semantically equivalent objects which exist in different memory locations; and means for, if at least one of:

a number of occurrences for said semantically equivalent objects exceeds a first threshold value, said threshold value being at least two; and a number of equality tests on said semantically equivalent objects exceeds a second threshold value;

identifying an application program interface to reduce said semantically equivalent objects to a single object in a single memory location.

* * * * *